United States Patent
Zelikovskaya et al.

(10) Patent No.: US 9,822,944 B2
(45) Date of Patent: Nov. 21, 2017

(54) VEHICLE LIGHT ASSEMBLY HAVING A COLORED APPEARANCE IN AN UNLIT STATE

(71) Applicant: Magna International Inc., Aurora (CA)

(72) Inventors: Nadezhda Aleksandrovna Zelikovskaya, Plymouth Township, MI (US); David Patrick Hess, Brighton, MI (US)

(73) Assignee: Magna International Inc., Aurora, Ontario (CA)

( * ) Notice: Subject to any disclaimer, the term of this patent is extended or adjusted under 35 U.S.C. 154(b) by 78 days.

(21) Appl. No.: 15/157,985

(22) Filed: May 18, 2016

(65) Prior Publication Data

US 2016/0341392 A1    Nov. 24, 2016

Related U.S. Application Data

(60) Provisional application No. 62/165,447, filed on May 22, 2015.

(51) Int. Cl.
| | |
|---|---|
| *G02B 6/00* | (2006.01) |
| *F21S 8/10* | (2006.01) |
| *F21V 8/00* | (2006.01) |
| *F21Y 101/02* | (2006.01) |

(52) U.S. Cl.
CPC ............ *F21S 48/215* (2013.01); *F21S 48/22* (2013.01); *F21S 48/2243* (2013.01); *F21S 48/2262* (2013.01); *F21S 48/2281* (2013.01); *F21S 48/25* (2013.01); *G02B 6/0065* (2013.01); *F21Y 2101/02* (2013.01)

(58) Field of Classification Search
CPC . G02G 6/00–6/54; G02F 1/13–1/13378; F21S 48/20–48/255
See application file for complete search history.

(56) References Cited

U.S. PATENT DOCUMENTS

| | | |
|---|---|---|
| 5,275,764 A | 1/1994 | Hettinga |
| 5,756,013 A | 5/1998 | Yanagihara et al. |
| 5,922,369 A | 7/1999 | Yanagihara et al. |
| 6,811,287 B2 | 11/2004 | Roller et al. |

(Continued)

FOREIGN PATENT DOCUMENTS

| | | |
|---|---|---|
| EP | 1582897 A2 | 10/2005 |
| WO | WO-2013029730 A1 | 3/2013 |

*Primary Examiner* — Christle I Marshall
(74) *Attorney, Agent, or Firm* — Harness, Dickey & Pierce, P.L.C.

(57) ABSTRACT

A vehicle light assembly is provided that exhibits a colored appearance when in an unlit state. The vehicle light assembly comprises: a housing; one or more light sources mounted in the housing; and a light guide configured to receive light from the one or more light sources and project the light outwardly from the light guide. The light guide includes a first segment proximate to the one or more light sources and a second segment distal from the one or more light source, such that the light from the one or more light sources passes through the first segment of the light guide before passing through the second segment of the light guide. Of note, the first segment is comprised of a colorless material; whereas, at least a portion of the second segment is comprised of a colored material.

10 Claims, 6 Drawing Sheets

(56) References Cited

U.S. PATENT DOCUMENTS

| | | |
|---|---|---|
| 6,908,219 B1 | 6/2005 | Reiss |
| 7,795,634 B2 | 9/2010 | Wilson et al. |
| 8,043,672 B2 | 10/2011 | Ikeda et al. |
| 8,780,026 B2* | 7/2014 | Mun .................... G02B 6/0055 345/87 |
| 9,019,448 B2* | 4/2015 | Han .................. G02F 1/133621 349/106 |
| 9,366,412 B2* | 6/2016 | Kim ......................... F21V 9/08 |
| 2012/0020103 A1* | 1/2012 | Okada .................. B60Q 1/2607 362/510 |
| 2013/0148371 A1* | 6/2013 | Kim ......................... F21V 9/08 362/510 |
| 2015/0003106 A1* | 1/2015 | Thompson ........... G02B 6/0035 362/607 |

\* cited by examiner

VEHICLE LIGHT ASSEMBLY HAVING A COLORED APPEARANCE IN AN UNLIT STATE

CROSS-REFERENCE TO RELATED APPLICATIONS

This application claims the benefit of U.S. Provisional Application No. 62/165,447 filed on May 22, 2015. The entire disclosure of the above application is incorporated herein by reference.

FIELD

The present disclosure relates to a vehicle light assembly with a colored appearance in an unlit state.

BACKGROUND

Automobiles and other motorized vehicles employ different types of light assemblies, including headlamps, warning lamps, and signaling lamps. In some of these applications, it is desirable for the vehicle light assembly to have a colored appearance, such as orange or red. It can be difficult, however, to achieve a colored appearance without negatively impacting the performance and cost of the light assembly. For example, constructing the entire light guide from a tinted material significantly lowers transmission properties which leads to decreased light output and/or use of higher cost electronics. In a different approach, the vehicle light assembly may use a tinted lens to create a colored appearance. Likewise, this approach increases complexity and cost of the light assembly.

Therefore, it is desirable to provide a vehicle light assembly that exhibits a colored appearance in an unlit state while achieving high optical efficiency and cost containment.

This section provides background information related to the present disclosure which is not necessarily prior art.

SUMMARY

A vehicle light assembly is provided that exhibits a colored appearance when in an unlit state. The vehicle light assembly comprises: a housing; one or more light sources mounted in the housing; and a light guide configured to receive light from the one or more light sources and project the light outwardly from the light guide. The light guide includes a first segment proximate to the one or more light sources and a second segment distal from the one or more light source, such that the light from the one or more light sources passes through the first segment of the light guide before passing through the second segment of the light guide. The distance the light travels through the first segment of the light guide is preferably longer than distance the light travels through the second segment of the light guide. The first segment of the light guide is comprised of a colorless material and the second segment of the light guide is comprised of a colored material. The colorless material of the first segment of the light guide preferably has a higher transmissivity than the colored material of the second segment of the light guide.

In one embodiment, the vehicle light assembly further includes a bezel that encases the light guide, such that the bezel has an opening and the second segment of the light guide protrudes through the opening of the bezel.

In another embodiment, the light guide is a single integral member formed using a two-stage injection molding process.

In another aspect of this disclosure, the vehicle light assembly includes: a base plate; a circuit board mounted to the base plate; one or more light emitting diodes mounted to the circuit board; a light guide arranged adjacent to the one or more light sources and configured to receive light from the one or more light emitting diodes; and a bezel attached to the base plate and encasing a first segment of the light guide between the bezel and the base plate. The bezel has an opening through which a second segment of the light guide protrudes, such that the light from the one or more light sources passes through the first segment of the light guide before passing through the second segment of the light guide. The first segment is comprised of a colorless material and a portion of the second segment is comprised of a colored material.

The vehicle light assembly may further include a lens attached to the base plate and encasing the second segment of the light guide between the lens and the bezel.

In one embodiment, the light guide is a single integral member and the second segment of the light guide is comprised entirely of a colored material.

In another embodiment, the light guide includes an integral member comprised entirely of a colorless material with a layer of colored material disposed on an exterior surface of the second segment of the light guide. The layer of colored material may be either translucent or opaque.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figures 1, 2A:
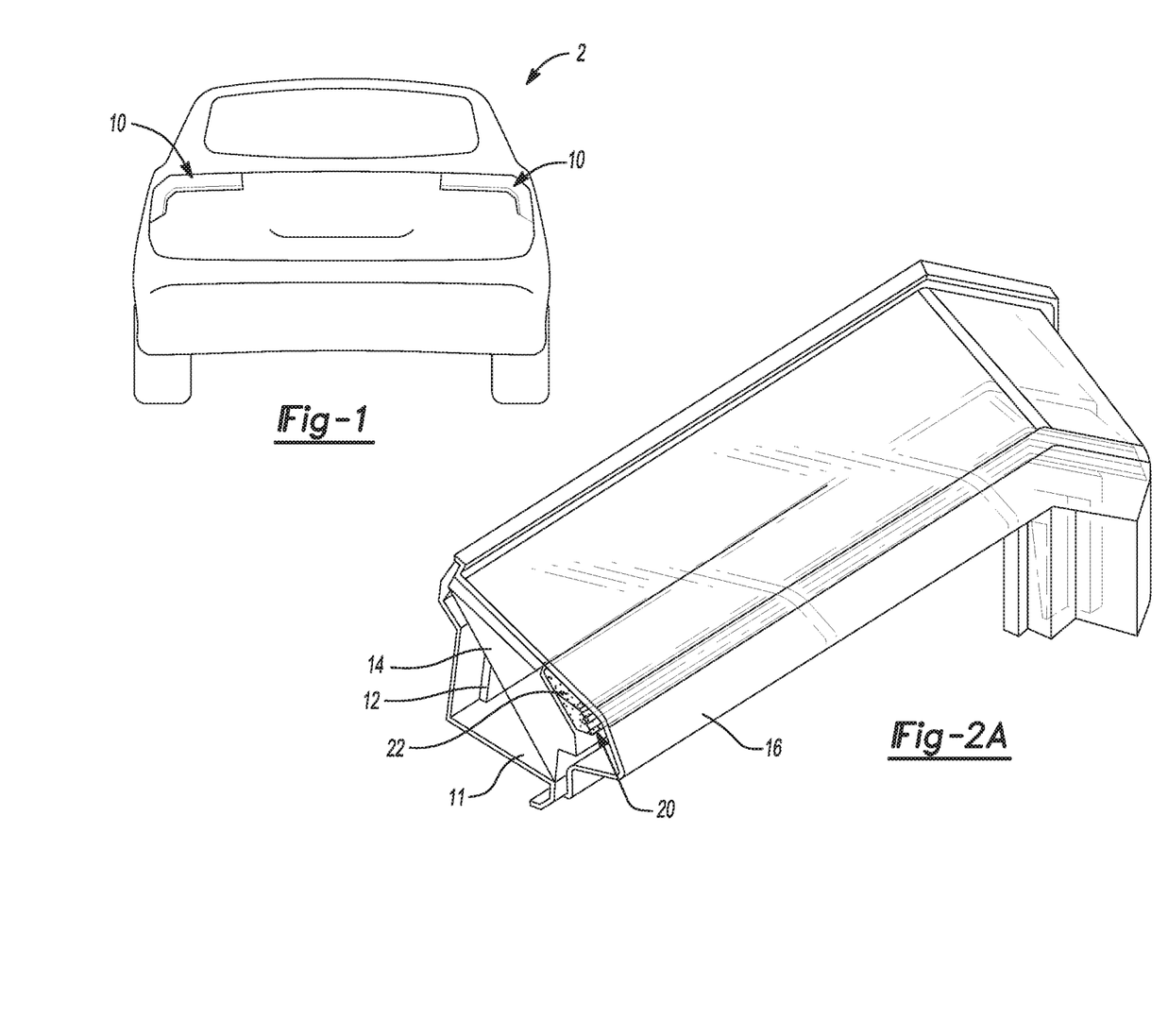
FIG. 1 is a perspective view of a vehicle with a vehicle light assembly.
FIG. 2A is a perspective view of an example vehicle light assembly with a lens.

FIG. 1 depicts a vehicle 2 having a vehicle light assembly 10 as shown. In this embodiment, the vehicle light assembly 10 functions as a taillight assembly for the vehicle 2, but it is to be understood that this invention is equally applicable to other lamp assemblies, such as a headlight or turn indicator. Additionally, it is contemplated that vehicle light assembly 10 can be mounted to a vehicle either vertically or horizontally, and other shapes may be used.

Figure 2B:
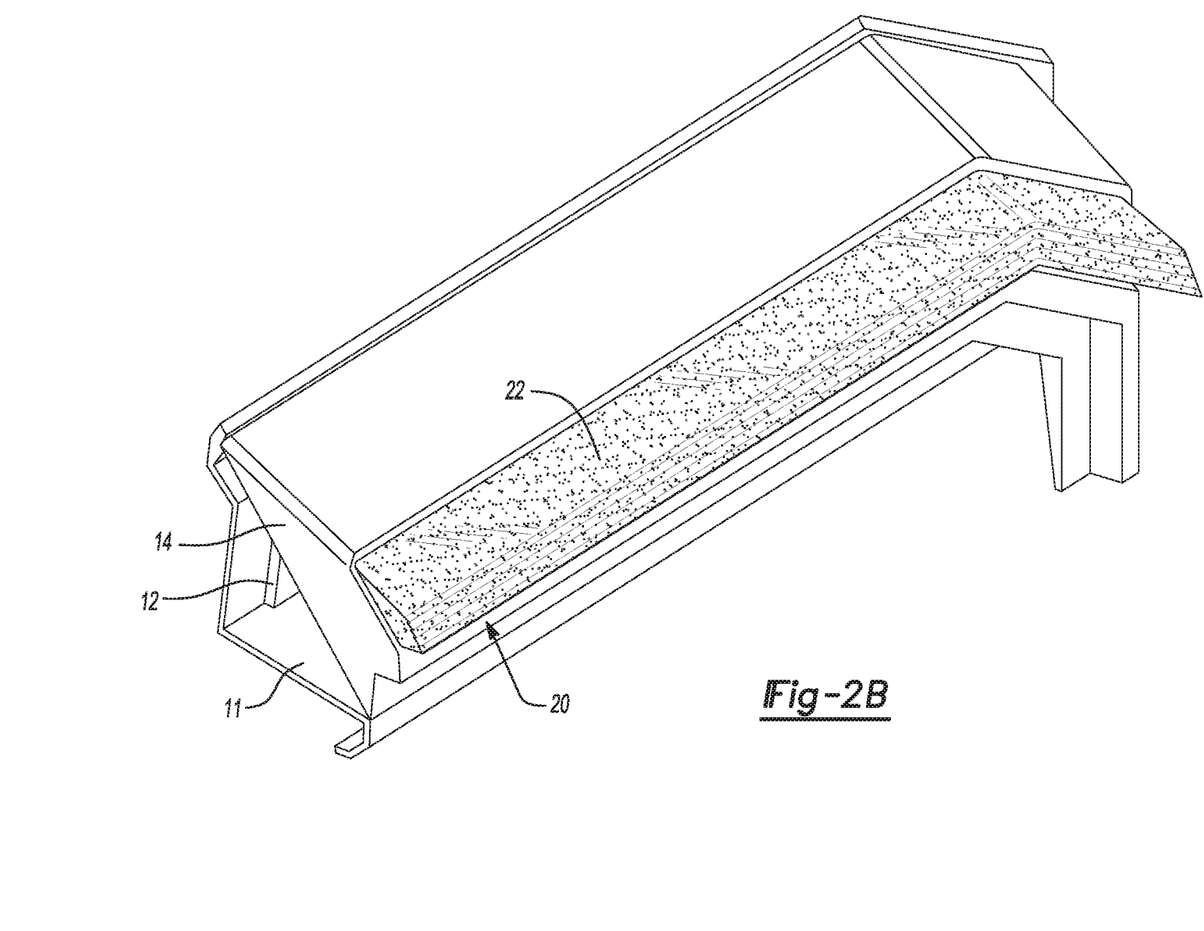
FIG. 2B is a perspective view of the example vehicle light assembly with the lens removed.
Figure 2C:
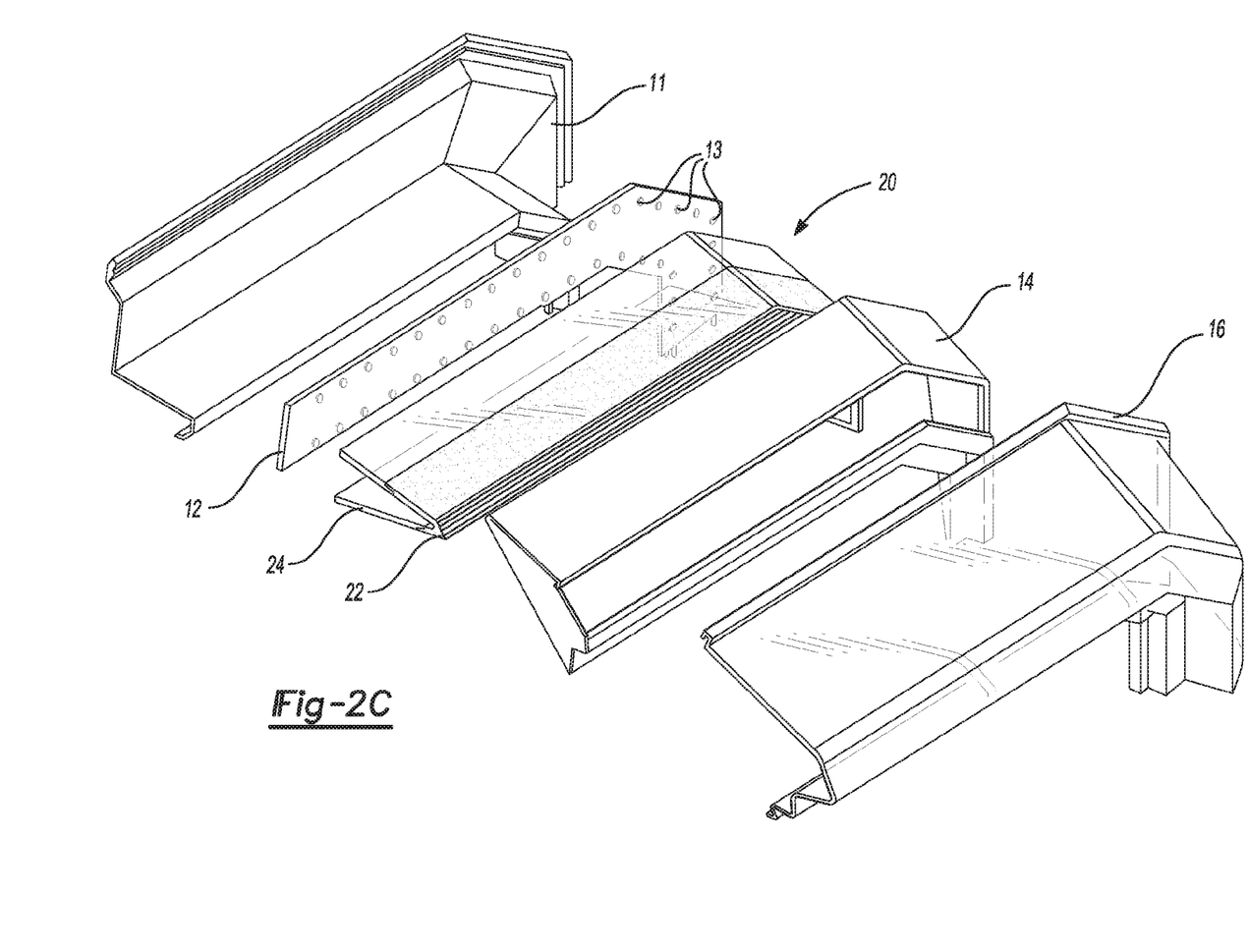
FIG. 2C is an exploded view of the example vehicle light assembly.

FIGS. 2A-2C depict an example vehicle light assembly 10. The light assembly is comprised generally of a back plate 11, a circuit board 12, a light guide 20, a bezel 14 and a lens 16. In this example, a plurality of light sources 13, such as light emitting diodes, are mounted along the upper surface of the circuit board 12. The light emitting diodes 13 may be white or more preferably correspond to the desired external appearance of the assembly, such as yellow, orange or red. Additionally, the strength of the light emitting diodes 13 may range from below 1 lumen to 1000 lumen. However, it is to be understood that the strength of the light emitting diodes 13 may also exceed this range in other applications.

In this example, the lower surface of the circuit board 12 is mounted to the upper surface of the back plate 11, for example by way of soldering or fasteners. The bottom surface of the light guide 20 may be adjacent the upper surface of the circuit board 12, and align with the light emitting diodes 13. Additionally, the inner surface of the bezel 14 may couple with the outer surface of the light guide 20, and the bottom surface of the bezel 14 may be adjacent to the upper surface of the back plate 11. In this way, the back plate 11 and bezel 14 may generally enclose the circuit board 12, light emitting diodes 13, and light guide 20 therebetween. It is to be understood that when then bezel 14 is mated with the back plate 11 in an assembled configuration, a first segment 24 of the light guide 20 will not be visible, but a second segment 22 of the light guide 20 will protrude through an opening in the bezel 14. The lens 16 primarily serves a styling function and seals the assembly although in some instances it may also perform an optics function, such as focusing the emitted light. In an assembled state, the lens 16 is coupled to the back plate 11 to form an enclosure for the other components. It is to be understood that the lens 16 may be replaceably or hermetically sealed to the back plate 11. The lens 16 can be made of a polycarbonate material, but it can also be made of any transparent material. The shape and construct of the assembly may vary depending on the particular application. Various construct for vehicle light assemblies are known in the art. It is to be understood that only the relevant components of the light assembly are discussed above, but that other components may be needed to construct an operational light assembly.

In operation, light is emitted from the plurality of light emitting diodes 13 and into the light guide 20. The light guide 20 guides the light towards the lens 16 from which it is projected outwardly from the vehicle light assembly 10. It is understood that an exit surface 29 of the light guide 20 may have different shapes (e.g., pillows, prisms, flutes, etc.) and is preferably configured to perform an optical function, such as patterning the exiting light. In an example embodiment, the light assembly 10 has a colored external appearance, such as yellow, orange or red, even in an unlit condition as will be further described below. While reference is being made to a vehicle 2, it is readily understood that the techniques for creating a colored appearance even in a unlit condition are applicable outside the context of a vehicle.

Figure 3A:
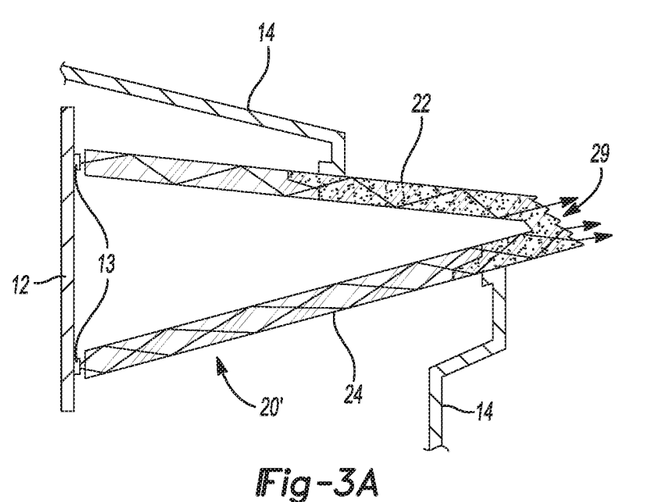
FIG. 3A is a cross-sectional view of a first embodiment of a light guide for use in the vehicle light assembly, showing penetration of light in an operating state.
Figure 3B:
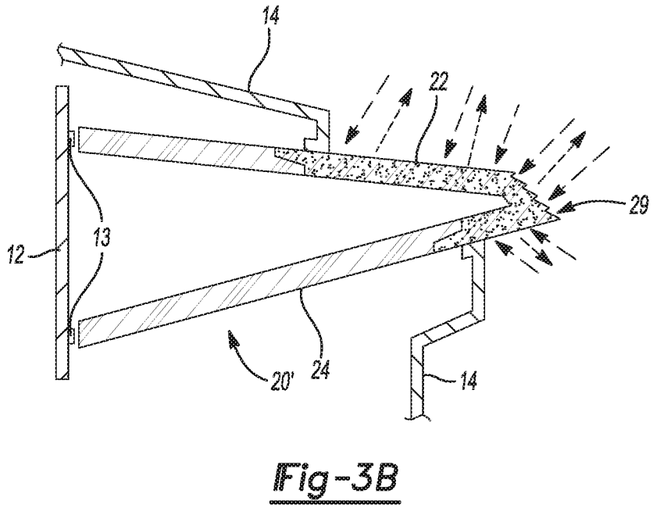
FIG. 3B is a cross-sectional view of a first embodiment of a light guide for use in the vehicle light assembly, showing light reflection in an unlit state.

FIGS. 3A and 3B depict a first example embodiment of a light guide 20' which may be implemented in the vehicle light assembly 10. Rather than constructing the entire light guide from a tinted material, only a portion of the light guide is constructed from a tinted material. Specifically, a second segment of the light guide indicated at 22 which protrudes beyond the bezel 14 is comprised of a colored material; whereas, a first segment (or the remainder) of the light guide indicated at 24 is comprised of a clear (i.e., without color) material. Materials are selected such that the first segment 24 has a higher transmissivity than the second segment 22. Length of the second segment 22 in relation to the length of the first segment 24 is guided by styling and packaging constraints.

In an operating state, light emitted from the light emitting diodes travel through the first segment 24 of the light guide before traversing through the second segment 22 of the light guide and then is emitted from the assembly as seen in FIG. 3A. Light emitting diodes 13 are typically spaced on the order 1 mm from the light guide or as small as mechanical and thermal constraints permit. Because the clear first segment 24 of the light guide has a higher transmission property than the second segment 22 of the light guide, this embodiment has an improved optical efficiency over a light guide made entirely from a tinted material. It is noted that the length of travel through second segment 22 of the light guide is preferably shorter than the length of travel through the first segment 24 of the light guide.

In an unlit state, ambient light and other light from outside the light assembly reflects off the red surface of the protruding second segment 22 of the light guide as seen in FIG. 3B. In this way, the external appearance of the light assembly is red even in an unlit condition. It is readily understood that other colors, such as yellow or orange, may be used in place of red.

In an example embodiment, the light guide 20' is formed from an acrylic, polycarbonate or other types of translucent thermoplastic materials. The light guide 20' may be made, for example using a two-stage injection molding process. In a first stage, the second colored segment 22 of the light guide is shot and, in the second stage, the first uncolored segment 24 of the light guide is shot. The order of the stages can be reversed and is dictated by the shape and mechanics of the light guide. In this way, a one-piece light guide is formed for use in the light assembly 10. Each segment is preferably made from the same material or materials having similar properties (e.g., index of refraction) although constructing each portion of a different material is also contemplated. Other suitable materials may also be found in the List of Acceptable Plastics for Optical lenses and Reflex Reflectors Used on Motor Vehicles published by the Automotive Manufacturers Equipment Compliance Agency and incorporated herein by references. Other variants to this molding process as well as other types of manufacturing processes are also contemplated by this disclosure.

Figure 4:
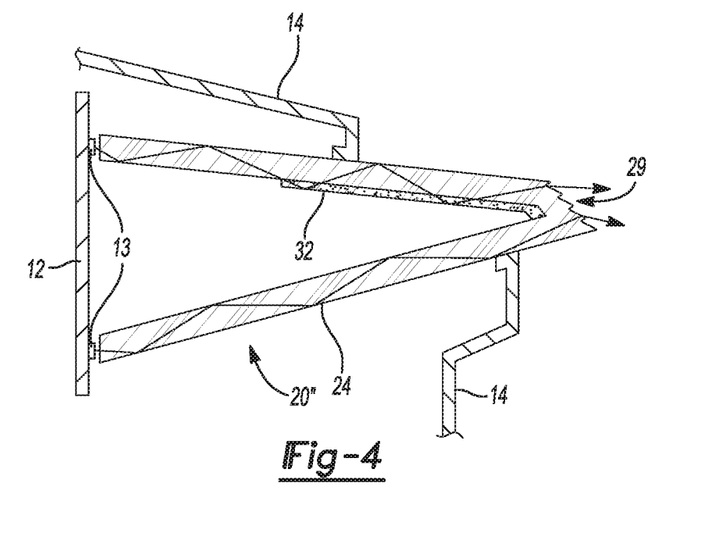
FIG. 4 is a cross-sectional view of a second embodiment of a light guide for use in the vehicle light assembly.

FIG. 4 depicts a second example embodiment of a light guide 20". In this embodiment, the light guide is primarily constructed from a clear material. A colored layer 32 of translucent material is formed on an exterior surface of the light guide 20". In an operating state, light emitted from the light emitting diodes travels through the light guide 20" before being emitted from the assembly. Because the colored layer is made of a translucent material, the light will be reflected through the colored layer 32 in the area of the light guide having the colored layer and thereby create a colored external appearance. The distance the light emitted from the light emitting diodes traverses through this colored layer 32 is reduced in comparison to the first embodiment, thereby improving the optical efficiency of this design.

In one embodiment, the colored layer may be formed on an inwardly facing surface of the light guide in the area of the light guide which protrudes beyond the bezel. Additionally or alternatively, the colored layer may also be formed on an outwardly facing surface of the light guide. In any case, light from outside the light assembly reflects off the colored layer 32 to create a colored external appearance even in an unlit condition. Because the colored layer is translucent, components behind the bezel are visible via the light guide from outside of the assembly. Such a light guide may be made, for example using a two-stage injection molding process. In a first stage, the first uncolored segment 24 of the light guide is shot, and in a second stage, the colored layer 32 is shot. The order of the stages can be reversed and is dictated by the shape and mechanics of the light guide. In this way, a one-piece light guide is formed for use in the light assembly 10. It is again understood that the light guide could be made by other means. Except with respect to the differences discussed herein, the light guide 20" is substantially the same as the light guide 20' described above.

Figure 5:
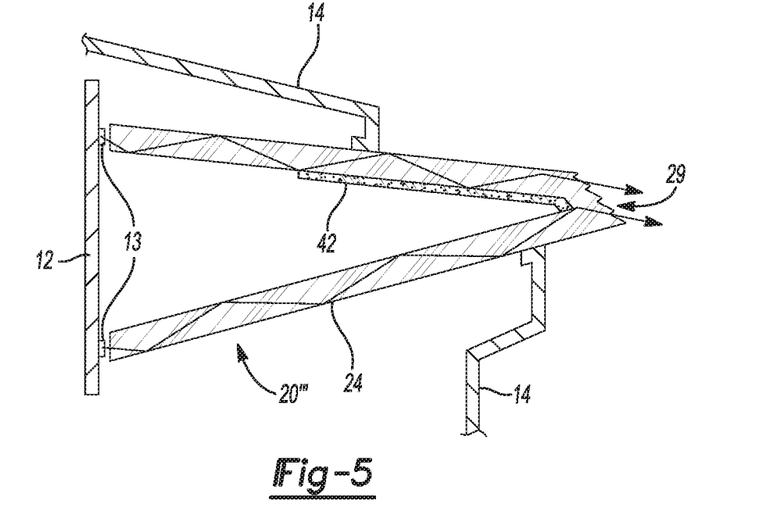
FIG. 5 is a cross-sectional view of a third embodiment of a light guide for use in the vehicle light assembly.

FIG. 5 depicts a third example embodiment of a light guide 20'''. In this embodiment, the colored layer 42 is comprised of a colored opaque material, but is otherwise the same as the light guide 20" described above. The opaque material exhibits a colored external appearance even in an unlit condition. For any optics perspective, the opaque material may be any plastic; whereas, from the molding perspective, the opaque material requires similar properties to the material forming the remainder of the light guide. Different colors and levels of opacity can be achieved by adding traces of other chemical compounds to the material.

In an operating state, light emitted from the light emitting diodes travels through the light guide 20''' before being emitted from the assembly. In this embodiment, the light will be reflected off of the colored layer 32 without passing through the colored layer 32 as seen in FIG. 5. As a result, the light assembly will have a colored external appearance. An added advantage of this embodiment is that the components behind the bezel are not visible from outside of the assembly which may be preferable to some customers.

Figure 6:
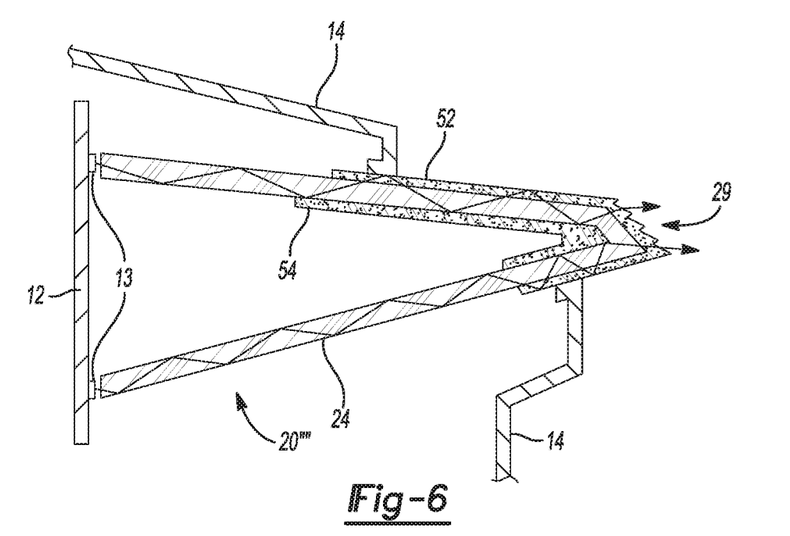
FIG. 6 is a cross-sectional view of a fourth embodiment of a light guide for use in the vehicle light assembly.

FIG. 6 depicts a fourth example embodiment of a light guide 20"". This embodiment combines features from the two previously described embodiments. That is, a colored layer 52 of translucent material is disposed on the outwardly facing surface of the light guide along the area which protrudes beyond the bezel and a second layer of opaque material 54 is disposed on the inwardly facing surface of the light guide preferably along the area which protrudes beyond the bezel. It is envisioned that materials forming the colored layers 52, 54 may be switched. In other embodiments, the colored layers 52, 54 may be translucent on both the inwardly and outwardly facing surfaces of the light guide or the colored layers 52, 54, may be opaque on both the inwardly and outwardly facing surfaces of the light guide.

In this embodiment, the light guide 20"" may be made, for example using a three-stage injection molding process. In a first stage, the first uncolored segment 24 of the light guide is shot; in a second stage, the colored layer of opaque material 54 is shot; and in a third stage, the translucent colored layer 52 is shot. The order of the stages can be reversed and is dictated by the shape and mechanics of the light guide. In this way, a one-piece light guide is formed for use in the light assembly 10. However, it is to be understood that the light guide could be made by other means. Except with respect to the differences discussed herein, the light guide 20"" is substantially the same as those described above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A vehicle light assembly, comprising:
   a housing base;
   a circuit board mounted to the housing base;
   one or more light emitting diodes mounted to the circuit board and operable to project light;
   a light guide arranged adjacent to the one or more light sources and configured to receive light from the one or more light emitting diodes; and
   a bezel attached to the housing base and encasing a first segment of the light guide between the bezel and the housing base, the bezel having an opening through which a second segment of the light guide protrudes, such that the light from the one or more light sources passes through the first segment of the light guide before passing through the second segment of the light guide, wherein the first segment is comprised of a colorless material and a portion of the second segment is comprised of a colored material.

2. The vehicle light assembly of claim 1 further comprises a lens attached to the housing base and encasing the second segment of the light guide between the lens and the bezel.

3. The vehicle light assembly of claim 1 wherein the light guide is a single integral member and the second segment of the light guide is comprised entirely of a colored material.

4. The vehicle light assembly of claim 1 wherein said assembly is adapted to mount to a vehicle either horizontally or vertically.

5. The vehicle light assembly of claim 3 wherein the light guide is formed using a two-stage injection molding process.

6. The vehicle light assembly of claim 1 wherein the light guide includes an integral member comprised entirely of a colorless material with a layer of colored material is disposed on an exterior surface of the second segment of the light guide.

7. The vehicle light assembly of claim 6 wherein the layer of colored material is opaque.

8. The vehicle light assembly of claim 1 wherein the colorless material of the first segment of the light guide has a higher transmissivity than the colored material of the second segment of the light guide.

9. The vehicle light assembly of claim 1 wherein distance the light travels through the first segment of the light guide is longer than distance the light travels through the second segment of the light guide.

10. The vehicle light assembly of claim 1 wherein the colorless material is further defined as one of an acrylic or a polycarbonate.

* * * * *